United States Patent Office
3,705,858
Patented Dec. 12, 1972

3,705,858
PREPARATION OF RARE-EARTH-ACTIVATED
OXYSULFIDE PHOSPHORS
George William Luckey and Charles Frederick Sherwood, Rochester, N.Y., assignors to Eastman Kodak Company, Rochester, N.Y.
Filed Jan. 12, 1971, Ser. No. 105,888
Int. Cl. C09k 1/14; C22b 59/00
U.S. Cl. 252—301.4 S                  14 Claims

ABSTRACT OF THE DISCLOSURE

Novel processes for preparing inorganic rare-earth-activated phosphors and various compositions containing these phosphors are disclosed. Radiographic elements such as intensifying screens containing these phosphors, exhibit high image quality. Rare earth activated lanthanide oxysulfides can be prepared by heating and firing the first-formed sulfite precursors in fluxless, non-chalcogenating reducing amtospheres.

BACKGROUND OF THE INVENTION

Field of the invention

This invention relates to inorganic phosphors and to novel processes for preparing those inorganic rare-earth-activated phosphors having a high efficiency of fluorescence, high absorption of X-rays and low afterglow. In one aspect the phosphors prepared according to the processes of this invention find particular application when incorporated into radiographic screens, luminescent devices, and film-screen combinations. In another aspect this invention relates to simplified processes for preparing rare-earth-activated oxysulfides of lanthanum, gadolinium, yttrium and lutetium and to processes for preparing other oxysulfides.

DESCRIPTION OF THE PRIOR ART

The use of phosphorescent materials in radiographic intensifying screens, in cathode ray tubes, fluorescent lamps and the like is well known. However, the need for improved phosphor materials has become increased with the advent of expansion of color television, radiography, the plastics industry and many other areas of manufacture and technical advancement. Perhaps the most important phosphor for insuring optimum illumination, clarity, definition and contrast in these areas has been the red-emitting phosphor as contrasted with the yellow and green-emitters. Although the prior art contains numerous references to materials, processes and compositions of matter relative to this particular type of fluorescent phosphor, there have been considerable difficulties experienced heretofore in attempting to provide these phosphorescent compounds and the processes for preparing the particular phosphors having the desirable and necessary characteristics such as efficiency, crystal size, and crystal size distribution. Many known processes prior to the present invention, necessarily resulted in segregation of the host and activator ions and the formation of extraneous non-oxysulfide phases which were not only non-uniform in color but which also exhibited poor brightness under X-ray, ultraviolet or cathode ray excitations.

For example, it is known from U.S. Pat. 2,729,605 of Swindells issued Jan. 3, 1956, that the infra-red stimulated lanthanum oxysulfide phosphors which emit primarily in the green or yellow region of the spectrum can be activated with a wide variety of double activator combinations but these phosphors have not enjoyed commercial success for a variety of reasons. The phosphors of Pitha and Ward, described in U.S. Pat. 2,462,547 issued Feb. 22, 1949, and other europium-activated lanthanide oxysulfides appear to be less than satisfactory for use in conventional radiographic intensifying screens in that they lack the short lifetime required.

Lanthanide oxysulfides, of course, are not new and have in fact been directly made before by rather cumbersome means such as by reacting lanthanide sulfide with wet hydrogen at temperatures near 500° C. followed by treatment with acetic acid. Alternatively this is followed by heating to about 1300° C. Other methods of preparing other lanthanide oxysulfides such as those for yttrium oxysulfide comprise treating the oxide with hydrogen sulfide at 1100° C. but this is not adequate in producing the lanthanum counterpart.

One of the most perplexing problems in the attempted manufacture of these and other phosphors, i.e. particularly the red-emitting oxide phosphors, has been the difficulty in being able to control the phosphor particle size by any known means. For example, even when conventional coprecipitation processes and heat decomposition are employed to yield acid salts such as the oxalates from mixed solutions of host nitrates followed by firing, the resulting fired phosphor particles are still at best only about as small in size as the first-prepared oxalates. But even less acceptable, in these heat decomposition processes as an incident thereto, there are formed large distributions of ultrafine particles, possessing poor particle configuration and having unwanted surface irregularities.

In order to attempt to obviate this inadequacy, a lengthy dual-step high temperature firing treatment has been described by Kobayashi et al. in Canadian Pat. 779,860 issued Mar. 5, 1968 in which at least one flux, such as borax, is used. This attempted use of a single firing step with a greater concentration of a flux unfortunately still produced both ultra fine particles and an undesirable vast particle size distribution. Furthermore, the use of a flux in the preparation of phosphors unfortunately provides an unwanted afterglow as disclosed in Canadian Pat. 779,211 issued Feb. 27, 1968 to Kobayashi et al. and increases the susceptibility of the phosphor to contamination introduced during its synthesis and long heating.

Still other proposed methods of manufacture of oxychalcogenide phosphors are disclosed in U.S. Pats. 3,418,246 and 3,418,247 issued to Royce and Yocom, respectively, Dec. 24, 1968. However, these all employ processes which simultaneously bring together all the various phosphor constituents at a particular temperature range and include the known firing steps in chalcogenizing atmosphere or reducing atmosphere. Nonetheless, the particle size and distribution still remain far less than desirable.

Even though Byler et al. in U.S. Pat. 3,515,675 issued June 2, 1969, understandably recognize the importance of size, size distribution and control of phosphor crystals, they found it absolutely impossible to directly produce oxysulfide crystals of desired size, stoichiometry and optical size by any means. On the contrary, they proceeded to rely upon the formation of an intermediate oxide phase and then to employ a series of high temperature firings in which the atmosphere employed contained the chalcogen, sulfur in addition to hydrogen and oxygen.

The use of sulfur containing atmospheres, repeated firings for extended periods of time, fluxes and their subsequent removal, repeated grinding techniques to crush the phosphor slag and subsequent pulverization and the like are not only cumbersome and costly but have likewise failed to provide the long sought and desired size and distribution of effective phosphors. A simple process which insures controlled grain size, size distribution, emission and lifetime of emission would be a marked and desirable advancement in the art. In particular, the availability of new phosphors and processes for their manufacture would greatly enhance the radiographic, tele-communications, visual and lighting and still other arts.

SUMMARY OF THE INVENTION

This invention relates to new inorganic luminescent phosphors, to various compositions containing said phosphors and to processes for the manufacture of said phosphors. In one particular aspect this invention provides a process for directly producing rare-earth-activated oxysulfide phosphor crystals from their precursors by means which insure superb, substantially uniform crystal structure and high fluorescent efficiency. The process employed can utilize in part the known double-run coprecipitation technique in providing the lanthanide sulfite precursor crystals from which the oxysulfides are subsequently produced by heating in a reducing atmosphere, such as a hydrogen-containing atmosphere followed by igniting at higher temperatures in an inert atmosphere. These processes are fluxless and do not employ chalcogenating halide or sulfur containing atmospheres.

In an alternative process, the lanthanide sulfite crystals are prepared by dissolving the lanthanide oxides in sulfurous acid followed by heating the solution with stirring to cause precipitation of the sulfite. Heating and firing of this phosphor precursor are similar to that described for the coprecipitation process.

The phosphor compositions described in the present invention and prepared by the novel processes disclosed can be further identified with ease by reference to the following empirical formula

$(La_{1-x}A_x)_2O_2CH$ in which A is at least one trivalent rare earth metal ion selected from the group consisting of those metal ions having an atomic number of 57 to 71 exemplified in part by terbium, thulium, samarium, praseodymium dysprosium, europium and the like; $x$ has a value of about .0001 to about 0.10 and La is lanthanum, yttrium, gadolinium or lutetium and CH is a chalcogen such as sulfur, selenium, or tellurium but not oxygen.

It is one object of the present invention to provide new and improve luminescent rare-earth activated inorganic oxysulfide phosphors by improved methods as more fully described hereafter.

It is another object of this invention to provide compositions of matter more useful and more efficient than similar articles now known for use in radiography, television, plastics and other technical areas which utilize the substantially red- and green-emitting phosphors described herein.

It is still another object of the present invention to provide highly efficient luminescent materials by commercially feasible, economical means.

Still other objects will become apparent from an examination of the specification and claims which follow.

DESCRIPTION OF THE PREFERRED EMBODIMENTS

In accordance with this invention the above objects and others are attained with new inorganic phosphors activated by a rare-earth metal and based on host matrices derived from yttrium and lanthanide elements having an atomic number from between 57 to 71. The novel processes employed provide new phosphors of extraordinary luminescence and substantially uniform size and size distribution, such that, when incorporated into various radiographic elements, such as screens and the like, fluorescent tubes cathode-luminescent tubes and other objects, these phosphors impart a superior phosphorescent quality heretofore unavailable.

These inorganic phosphors are obtained from precipitated lanthanide non-oxygen chalcogenites by employing a significantly improved and novel process which can include the coprecipitation method described in Luckey Belgian Pat. 703,998 issued Mar. 18, 1968. By this method there is simultaneously metered, i.e. separately introduced into a reaction solution, at a controlled rate for each aqueous solution of less than about 0.1 mole/liter of reaction solution/minute, aqueous solutions comprising yttrium and lanthanide cations and activating cations and sulfite, selenite or tellurite anions which form a precursor for said phosphors. By reaction solution, it will be understood to mean the solution in which the anion and cation react and does not refer to a reacting solution, i.e. one which itself enters into the reaction. Within these rates, a wide latitude exists, however, limited only by that rate which insures maintaining in the reaction solution throughout the reaction, a concentration of up to about 1 molar of an excess selected from an excess of said anions over said cations or an excess of said cations over said anions. Local excesses of said anions and cations are prevented in the reaction solution by a variety of means as disclosed fully in Luckey (supra) such as by agitation, vessel shape and otherwise. The resulting lanthanide sulfite phosphor precursor crystals are then grown in the reaction solution to at least a size of 0.5 micron. However, the unexpected improvement in this process for phosphor preparation is achieved over these first described steps by next heating the precipitated lanthanide sulfite crystals in the absence of a flux, in reducing gas atmosphere which gas is devoid of any activating sulfur, selenium or tellurium or any interactivating group containing said elements. Following this, the thus-fired phosphor crystals are ignited, i.e. heated to a higher temperature in an inert or mildly reducing atmosphere for a limited period of time. Although this coprecipitation method produces exceptionally good results, still other methods for preparing the lanthanide sulfite precursor are contemplated and can be used, e.g. dissolving the lanthanide oxide or hydroxide in sulfurous acid and the like followed by growth of the sulfite crystals to the desired size by heating.

It could not have been expected that by modifying the method of Luckey and, by extending it to include the particular methods of first heating and then annealing in the gas atmospheres described and set forth hereafter, one could achieve the dramatic results of phosphorescence and efficiency of the inorganic, rare-earth metal-activated oxysulfide phosphors disclosed.

The process of this invention can be generally summarized in one aspect briefly as follows:

Inorganic phosphors, activated by a rare-earth metal and based on a lanthanide host matrix, are prepared by a process which comprises first forming and precipitating a phosphor precursor and then heating and next igniting said precursor and thereafter recovering the corresponding phosphor crystals derived from said precursors. This process employs in the heating step for the phosphor precursor, a substantially fluxless, non-halide, and non-chalcogenating reducing gas. The host matrix is derived from yttrium and elements having an atomic number of from between 57 and 71 such as those lanthanide group elements. In the above-described process, the phosphor precursor is precipitated by double-run coprecipitation of the cations containing a rare earth metal and anions which together finally form the inorganic phosphors.

More specifically, lanthanide cations such as lanthanum, yttrium, gadolinium and lutetium and activator ions such as those of the lanthanide series like europium, terbium, thulium, samarium, dysprosium, praseodymium and the like and sulfite ions are separately introduced into a separate aqueous reaction solution comprising sulfite anions or lanthanide ions. This separate solution has been prepared and placed in a reaction vessel designed to facilitate agitation. Preferably the desired flow rates and thorough mixing are maintained and local excesses of cation or anion are avoided throughout the reaction. An excess of anions or cations up to about 1 molar is maintained and the crystals of lanthanide sulfite grown in the reaction solution achieve a size of at least about 0.5 micron. Typically at least about 40 percent and more desirably about 50 percent by weight of the phosphor precursor is composed of crystals of this size. The rate of addition of each of the anions and cations is sufficient to maintain the concentration of up to about 1 molar of an excess of anion or cation and preferably less than about 0.1 or less than about 0.04 mole/liter of reaction solution per minute. The relative ratios of the lanthanide cations to each other are adjusted to provide the ratio in the final product as desired with a substantially wide range.

For a better understanding and appreciation of the present invention, reference is had to the accompanying illustrations and figures.

Figure 3:
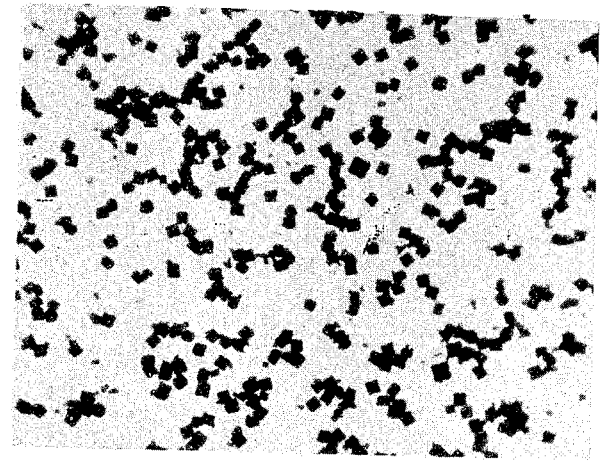
FIG. 3 is an electron microscope photograph of 250 magnification which records the grain size and size distribution of lanthanum oxysulfide phosphors prepared by the present process comprising the steps of precipitation, reduction and annealing.
Figure 2:
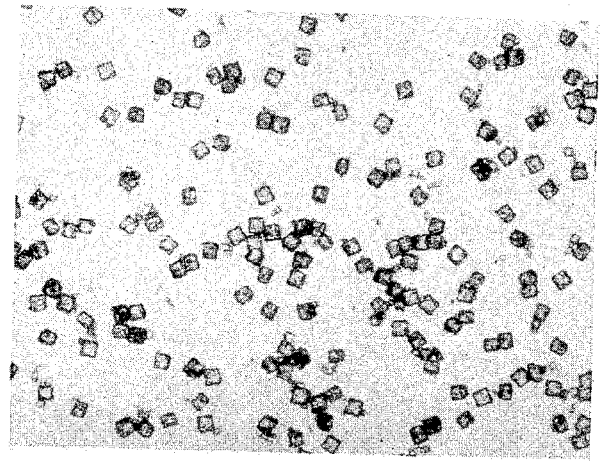
FIG. 2 is a similarly magnified photograph of the phosphor precursor slurry after ripening 1 hour at 95° C.
Figure 1:
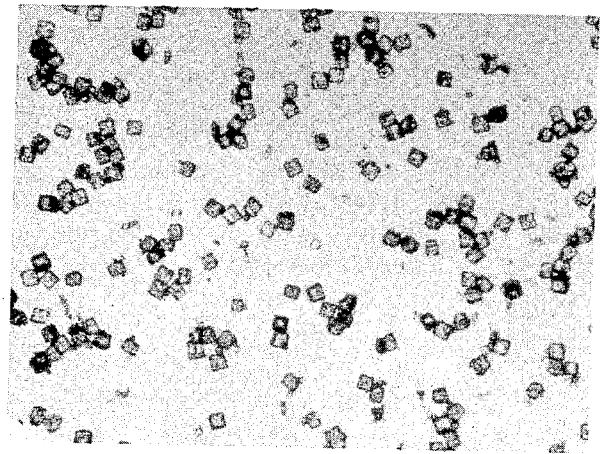
FIG. 1 is an electron microscope photograph, magnified 250 times, of an unripened slurry of europium-containing lanthanum sulfite precursor produced by the double-run coprecipitation process described in Lucky Belgian Pat. 703,998 which comprises the preliminary steps of crystal preparation in the present invention.

In comparing all three photographs, it is seen from FIG. 3 that while the crystal size has diminished only slightly, the crystal shape has been retained and the index of refraction increased substantially as shown by the opacity of the crystals.

In one particular aspect the lanthanide cations and sulfite anions added to the aqueous reaction solution from separate aqueous solutions can each have concentrations up to about 1.5 molar, although these solutions preferably are less concentrated than 1 molar, and particularly less than about .5 molar. Salts of the anions and cations are advantageously dissolved in solutions and any salt can be used which does not have a deleterious effect on the phosphor. The lanthanide salts can include the lanthanide halides such as the chlorides, bromides and iodides, the nitrates, perchlorates, halogenates and acetates and the like as they are all soluble with both yttrium and lanthanum. However, particularly preferred lanthanide salts are the halides. It will be clearly understood that the starting materials are not limited to the above mentioned salts. Many sources of lanthanide and rare earth ions are possible, the source is not critical to this part of the invention provided the salts are soluble and the byproducts of the reaction do not interfere, i.e. by forming another precipitate or by causing significant losses in the fluorescence efficiency of the phosphor.

The maximum concentration of anions, cations, and activator ions in the solution of reactants added to the reaction solution depends upon the efficiency in preventing local excesses of reactants.

For best results, an excess of lanthanide cation is employed during most of the reaction when preparing these phosphor precursors. The dilute concentration of cations in the reaction solution can be maintained in any convenient way, such as, for example, by metering a suitable solvent, and solutions of the anions and cations required to form the phosphors together with the activator ion required, into the reaction solution at a predetermined rate to maintain the desired low concentration of cations throughout the reaction. However, phosphors with good speed have been made from lanthanide sulfite crystals prepared in the presence of excess sulfite.

The reaction solution should be such as to allow the growth of crystals of the phosphor precursor to above at least about 0.5 micron, and preferably above about 1 micron. Any suitable reaction solution can be used which allows such growth. Aqueous solutions are preferred; however, various organic solvents can be used, if desired, such as formamide, alcohols such as ethanol, dimethyl formamide, acetic acid and the like. The pH of the reaction solution can be varied to provide proper characteristics for the growth of phosphor crystals.

The precipitation of the lanthanide sulfite can be conducted over a relatively wide temperature range and advantageously in subdued light or in yellow or red light to limit photochemical deterioration of the sulfite solutions. Oxidation of the chalcogenite solution by air may be decreased by using organic antioxidants such as hydroquinone. Good results are generally obtained when the reaction solution is within the temperature range of from about 20° to 100° C. Lower temperatures can be employed and may be preferred in the preparation of certain phosphors. Generally, it is advantageous to use temperatures of from 70° to 100° C. Higher temperatures can be employed; such temperatures, however, are not necessary to obtain good initial crystal growth and results in accordance with the invention. Likewise, low light intensity is preferred to impede any photochemical reaction. Solutions of anions and cations, as well as solutions of the activator ion and acids or bases to regulate the pH of the reaction solution can be heated if desired prior to introducing such solutions into the reaction solution. Although lanthanide chalcogenite crystals with proper shape and size distribution can be formed directly by this coprecipitation process, a subsequent ripening step usually improves the uniformity and crystal structure of the precipitate. This ripening usually comprise heating the precipitate in the supernatant solution at temperatures from about 90° C. to about 105° C. for about ½ to about 2 hours, but longer times and other temperatures can be used.

The reaction conditions described above are most useful in the formation of the lanthanide precursor for making the novel inorganic phosphor crystals, such as the lanthanum oxysulfide and its rare earth activated species described hereafter.

The time required for ignition of the lanthanide sulfite in reducing atmosphere such as hydrogen or mixtures of hydrogen, water and an inert gas can be easily determined by a variety of means such as by measuring the evolution of water vapor from the reaction. The flow of gas, such as hydrogen in the ignition step is terminated when water vapor from the reaction stops evolving and can no longer be detected by condensation on a plate at room temperature. When a high pressure of water vapor is added to the reducing gas stream before it enters the reaction vessel monitoring by observing condensation on a plate becomes more difficult and quantitative measurement of the rate of water evolution becomes necessary. This may be done by condensing the effluent and measuring its volume or by using a sensor to determine the water content of the gas stream. The precise conditions for the subsequent annealing step can be determined by X-ray diffraction. The phosphor resulting from the initial gas-solid reaction step has a very small grain size and low crystallinity and, therefore, is heated until the diffraction pattern becomes sharp. These X-ray diffraction studies show that the reduced phosphor consists essentially of lanthanum oxysulfide and that no appreciable amounts of other lanthanum compounds or intermediate residues such as mixed oxides are present.

It has been found to be particularly useful in the practice of this invention to follow the step of heating in the reducing atmosphere, by heating without the necessity of removing the fired phosphor crystals from the furnace. For example, where it has been designed so that these two furnaces, i.e. one for firing and the other for annealing, are adjacent each other, the ignited crystals are conveniently transported from one to the other under inert atmosphere by the simple expedient as pulling, such as on a sled. It has been noted that the reaction, by which the lanthanum oxysulfide is formed from the lanthanum sulfite, produces and liberates free sulfur as a vapor. The condensation thereof is substantially controlled by warming those cooler areas of the apparatus which is used to exclude air. Alternatively the sulfur can be deliberately condensed on removable inserts. It is not believed that any degree of criticality applies to the various apparatus employed and consequently, Vycor (a registered trademark of Corning Glass, Inc. for heat and chemical resistant porcelain or quartz glassware) apparatus can be used. Attack of this external apparatus by the phosphor is prevented by using aluminum oxide or carbon boats, crucibles and inserts.

The preferred reaction solution for the preparation of the precursors of these inorganic phosphors by coprecipitation is an aqueous acidic solution having a pH of up to about 5.5. Generally, best results are obtained with acidic solutions having a pH of less than about 4.5 and especially at a pH of between about 1.5 and about 4. The acidity of the reaction solution can be controlled in any convenient manner, such as metering acid or acidic solutions into the reaction solution. A wide variety of acids can be employed to control the pH, such as hydrochloric, hydrobromic, trifluoro acetic, dichloro acetic, monochloro difluoro acetic, sulfurous nitric, perchloric, and acetic acids and the like. Any acid which tends to react with the sulfite, such as nitric acid, should not be employed in large quantities.

With the lanthanum oxysulfide phosphors containing rare earth activators in accordance with the practice of the invention, univalent cations can be present in the reaction mixture in a concentration of up to about 2 molar and preferably from about 0.02 to 0.4 molar. A preferred univalent cation is ammonium but sodium or potassium ions can also be used.

It can be readily seen by those skilled in the art that the cations described herein are preferably selected from yttrium and the group of lanthanides having an atomic number between 57 and 71 and that the preferred anions are sulfites.

From the preceding steps detailing the initial phase of crystal growth, the present invention includes the successive steps of heating the lanthanide chalcogenite crystals in the presence of hydrogen with or without water vapor and an inert gas at temperatures from about 700° C. to about 950° C. until evolution of water vapor from the reaction essentially stops as shown by the methods described before. With the gas flows, temperatures, boats, and amounts of lanthanide chalcogenite used in the appended examples, this usually requires from 2 to 4 hours when the hydrogen gas flow is about 2 cfh as measured with a flow meter calibrated for air. However, the time of reaction can be varied over a wide range depending on the flow of reducing gas, the amount of chalcogenite precursor, the temperature, and the degree of mixing of the gas and solid. Preferably a temperature range of less than 950 C. is used such as from about 800° to about 900°. Thereafter, these fired crystals are annealed in an inert atmosphere at about 1000° C. to about 1400° C. and preferably about 1000° to about 1200° C. for about ½ to about 2 hours and preferably for a time of ¾ to about 1 hour respectively. The firing can be conducted within a substantially wide temperature range and preferably at less than ⅔ of the absolute melting point of the oxychalcogenide crystals.

The reducing gas atmosphere introduced in the ignition step does not comprise sulfur, tellurium or selenium which chalcogen enters into the reaction with the formed crystals. The gases in the reducing atmosphere can comprise those such as water vapor, hydrogen, argon, carbon monoxide, and the like. A substantially oxygen free environment is used in the ignition step. The rare earth activators of the inorganic phosphors of the present invention can be any of those which have an atomic number of from 57 to 71, such as praeseodymium, europium, dyprosium, ytterbium, thulium, terbium, samarium and the like. These activators can be present in a substantially wide concentration range such as from about 0.01 mole percent to about 20 mole percent. Other activators or coactivators such as those described in U.S. 2,462,547 issued to Pitha et al. on Feb. 22, 1949 can be used.

Among the various cations which are particularly useful in forming the host crystals of this invention are lanthanum, gadolinium, yttrium and lutetium while preferred anions include tellurium, selenium or sulfur.

It has been found that heating the lanthanide sulfite in air produces a lanthanide oxysulfate which can be subsequently reduced to oxysulfide by methods known and described in the prior art. Nevertheless, this complex procedure does not produce a better phosphor than those prepared by the simple reduction and ignition process described earlier in this application.

In further characterizing the oxysulfide phosphors of the present invention, it is found that said phosphors have a density of about 5.7 grams/cc. and as shown, exhibit increased luminescent efficiency. In sharp contrast thereto, these phosphor precursors existing as the respective sulfites, have a density of about 3.4 grams/cc. and have substantially no luminescent properties until ignited and converted to the oxysulfide phosphors described herein. FIG. 3, supra, clearly shows that the phosphors formed by ignition possess the greater density as shown by the decidedly smaller crystals.

A preferred use of the phosphors prepared according to the novel processes herein is in radiographic intensifying screens particularly because the absorption of X-rays by the lanthanum oxysulfide host is so high. In fact, the absorption of X-ray energy by the radiographic screens comprising these phosphors is so high that single sided radiographic systems can be employed which systems form part of the present invention. These single-sided radiographic systems provide such extraordinary sharpness and high speed that they are equal or superior to similar results obtained by conventional double-sided systems. When used in double-sided systems, it has been found most useful to include in the light-energy sensitive element, a crossover control system such as a light absorber. Among the various phosphors exhibiting the unexpected and long-sought crystal size, distribution and phosphorescence is the terbium-activated lanthanum oxysulfide which has a negligible after-glow and whose green emission makes it particularly suitable for fluoroscopic and radiographic application.

The intensifying fluorescent screens, which can form part of the radiographic element of our invention, consist essentially of the novel phosphors disclosed above which can be dispersed or suspended in a suitable binder such as those set forth in U.S. Pats. 3,300,310 and 3,300,311, supra. which employ a water-soluble copolymer of alkylacrylate and acrylic acid, copolymers of vinyl chloride and vinyl acrylate, polyvinyl butyral as set forth in German Pat. 1,186,332 issued Jan. 28, 1965, to Patten et al., a coherent film-forming macromolecular polymer binder such as resins, polymers or copolymers of polycarbonate which comprise recurring carbonate units in the polymer chain, and the like, polymers of acrylic acid esters containing small percentages of a chlorine-containing derivative, such as acrylonitrile copolymers such as Hycar (a trademark of B. F. Goodrich Chemical Company for the thus-described dry rubber polymers). The phosphors can be present in the binder in a wide variety of ratios such as, for example, from about 30:1 to about 4:1 and preferably in the range of about 16:1 to about 6:1. The coverage of the phosphor can vary over a wide range. Effective coverage can be determined through experimentation. A preferred coverage of said phosphor in the screen is in a range from about 15 to about 150 grams/ft.$^2$. With respect to general purpose screens good results are achieved with a coverage in the range of about 50 to 110 grams/ft.$^2$ and with respect to high definition screens a coverage of from about 15 to 35 grams/ft.$^2$ yields good results. Likewise, these screens can be coated in a variety of ways such as directly over the photographic layer or on both sides of a double coated or single coated element. Intermediate layers, such as stripping layers, protective or overcoat layers, can likewise be employed between or over the X-ray emulsion layer and the intensifying screen. Said layers can comprise hydrophilic colloid material such as gelatin, gelatin derivatives, cellulose esters, alkyl acrylate-containing polymers and the like.

The radiographic elements of our invention employ, in addition to the rare earth activated lanthanide oxysulfide novel phosphor-containing intensifying screen, a suitably supported image recording layer such as one comprising silver halide as disclosed hereinbefore. The radiographic elements and combinations so described can be constructed such that the photographic elements are either separate, i.e. non-integral or integral, i.e. as a separate distinct layer of an element comprising a silver halide emulsion coated onto a support with the intensifying screen. Said silver halide can be present in a layer or coating such as a single coating or a double or dual coating, one on each side of a support. Suitable supports are those having the properties to permit their ready passage through a rapid automatic processor. Said support should, therefore, be reasonably flexible and preferably transparent, but able to maintain the dimensional stability and integrity of the various coatings thereon. Typical film supports are cellulose nitrate, cellulose ester, polyvinyl acetal, polystyrene, polyethylene terephthalate, other polyester, and the like. Supports such as cards or paper which are coated with α-olefin polymers, particularly polymers, of α-olefins containing two or more carbon atoms, as exemplified by polyethylene, polypropylene, ethylene-butene copolymers, and the like, give good results. In addition, if desired, said supports can comprise light absorbing materials either within the support itself, on a layer over and/or under said support, or both.

In addition to being suitably incorporated within an extrusion-formed base support, said light absorbing materials can optionally also be present when otherwise incorporated between the silver halide layers of the element. For example, these absorbing materials can be present both in the support and coated over the base support and carried in a suitable layer such as a hydrophilic colloid layer, like gelatin, or water dispersible vinyl polymers or mixtures thereof and the like.

The thickness of said support can vary as is well-known in the art in order to practice effectively our invention.

The silver halide can comprise varying amounts of silver chloride, silver iodide, silver bromide, silver chlorobromide, silver bromoiodide and the like. Particularly good results are obtained with gelatino silver bromoiodide emulsions in which the average grain size of the silver bromoiodide crystals is in the range of about 0.5 to about 5 microns. When a double silver halide coating is employed, the total silver coverage per area unit for both coatings would be less than about .080 gram and preferably, each such coating would contain less than about 0.040 gram of silver per square decimeter. These layers are applied by means well known in the art.

The proper transmittance in double coated systems can be obtained in a variety of ways, such as, for example by the incorporation of optically separating barriers, e.g. undercoats which can be positioned between the silver halide-containing layers, by altering the composition of said layers by including dyes or other materials, by adjusting the halide balance or by modification of silver halide grain shape, size distribution and the like.

The photographic coatings and emulsions described herein can be chemically sensitized with compounds of the sulfur group, noble metal salts such as gold salts, reduction-sensitized with reducing agents, and combinations of these. Furthermore, emulsion layers and other layers present in photographic elements comprising the novel phosphors in the radiographic elements and combinations made according to this invention can be hardened with any suitable hardener or combinations such as aldehyde hardeners, aziridine hardeners, hardeners which are derivatives of dioxane, vinyl sulfones, oxypolysaccharides such as oxystarch, oxy plant gums, inorganic hardeners such as chromium salts, and the like.

The silver halide coatings of the radiographic element useful in this invention can contain any of the hydrophilic, water-permeable binding materials suitable for this purpose. Suitable materials include gelatin, colloidal albumin, polyvinyl compounds, cellulose derivatives, acrylamide polymers and the like, alone or in combination and mixtures. The binding agents for the emulsion layer of the photographic element can also contain dispersed polymerized vinyl compounds. Certain of such compounds are disclosed, for example, in U.S. Pats. 3,142,568 of Nottorf issued July 28, 1964; 3,193,386 of White issued July 6, 1965; 3,062,672 of Houck et al., issued Nov. 6, 1962; and 3,220,844 of Houck et al., issued Nov. 30, 1965; and include the water-insoluble polymers and latex copolymers of alkyl acrylates and methacrylates, acrylic acid, sulfoalkyl acrylates or methacrylates and the like.

In addition, the radiographic combinations and image-forming elements useful in practicing this invention can also contain fogged internal image, silver halide emulsions as described in U.S. Pats. 3,397,987, issued May 20, 1968, to Luckey et al., 2,996,382, issued Aug. 15, 1961, to Luckey et al., and 3,178,282, issued Apr. 13, 1965, to Luckey et al. They can also contain silver halides deposited by vacuum as disclosed in U.S. Pat. 3,316,096, issued Apr. 25, 1967 to Rasch et al.

The photographic silver halide coatings can also contain additional additives, particularly those known to be beneficial in photographic emulsions. For example, they can contain speed-increasing compounds, for example, "onium" salts, such as quaternary ammonium or ternary sulfonium salts, polyalkylene glycols, thioethers and the like. The photographic silver halide coatings can be stabilized with mercury compounds, azaindenes, quaternary benzothiazolium compounds, hydroxy substituted aromatic compounds, and the like.

The photographic silver halide emulsions or coatings used in combination with screens comprising our novel phosphors can also contain non-ionic, anionic and/or amphoteric coating aids. Some useful coating aids include, for example, saponin, alkyl substituted aryl oxy alkylene ethyl sulfonates of the type described in U.S. Pat. 2,600,-831, issued June 17, 1952, maleopimarates of the type described in U.S. Pat. 2,823,123, issued Feb. 11, 1958, taurine derivatives of the type described in U.S. Pat. 2,739,891, issued on Mar. 27, 1956, and alkyl aminopropionates of the type described in U.S. Pat. 3,133,816 issued May 19, 1964. Typical of still other good coating aids and surfactants which can be employed in the emulsions used with the screens of this invention include the alkylphenoxy poly(hydroxyalkylene oxides) such as alkylphenoxy poly(glycidols) having from about 5 to about 12 glycidol units, for example, such as those disclosed in British Pat. 1,022,878, issued Mar. 16, 1966, to Olin Mathieson. The emulsions and radiographic combinations used and described herein can contain incorporated developing agents such as polyhydroxy benzenes, aminophenols and 1,3-pyrazolidones. The photographic emulsions can also contain spectral sensitizers such as cyanines, merocyanines, complex (tri-nuclear) cyanines and complex (tri-nuclear) merocyanines, styryls and hemicyanines.

The photographic silver halide elements which are part of the radiographic combinations described herein provide very good results in image sharpness without absolute need for any dyes or other light absorbing materials. While there is no need for employing dyes or other light absorbing materials in either the film, the screen, or both, extraordinary results can be obtained by using such dyes and light absorbing materials. Where used, light absorbing dyes and materials can be in the emulsion layer or in an auxiliary layer such as a layer coated between the support and the emulsion layer, or the light absorbing dyes and materials can be included in both the emulsion and the auxiliary layer. These elements can also contain inert particles such as those often employed as matting agents in photographic elements. Suitable materials of this type include, for example, particles of silicon dioxide, glass, starch, polymethyl methacrylate and the like. Such inert particles are often included in an emulsion layer alone and in combination.

These elements can likewise contain various protective overcoats such as those which comprise colloidal silica in an overcoat comprising gelatin and at least another hydrophilic colloid, including gelatin-compatible acrylic polymers which improve various physical characteristics and optical clarity.

A suitable process for radiographically recording images employing said combinations comprises exposing an element comprising silver halide, capable of producing a negative image, said silver halide being present in a total concentration of less than about 0.080 gram of silver per square decimeter, and a fluorescent intensifying screen comprising a terbium-activated lanthanum oxysulfide phosphor having its main spectral emission at about 544 and less intense peaks at about 490 and 588 nm. to high energy X-rays.

Processing can be effected in a variety of ways including the multi-tank manual methods but preferably in a unidirectional, multi-roller high speed processing apparatus described in Belgian Pat. 700,301, issued Aug. 31, 1967, to Barnes et al. These processes can be effected and the combinations of this invention can be processed respectively according to U.S. Pat. 3,232,761, issued Feb. 1, 1966, to Allen and Burness.

The silver-containing film-screen combinations of our invention can likewise be used with unexpectedly good radiographic results in solvent transfer systems such as where single and duplitized coatings are employed. In addition where positive images are so obtained they are easily converted to negative microfilm images either during or after processing. Equally good results are obtained when these novel combinations contain color couplers, such as those described in British Pat. 799,588 issued Aug. 13, 1958, to Whitmore and Elins, and by using these novel combinations and processes in color film-containing systems.

As a result of our novel phosphors and screens containing them, radiographic combinations are used effectively in recording X-ray images, and there is unexpectedly provided screen-film combinations having improved sharpness, and with vastly increased speed.

Where other elements of manufacture are intended, the phosphors produced by these novel processes are well incorporated, for example where used in shadow mask type color television tubes, the phosphor contains about 3 to about 8 mole percent europium activator and if other color emission characteristics than the red-emitters described above are desired, varying concentrations of europium or other activators can be employed.

Likewise, the phosphors of the present invention and prepared by the novel processes herein can be used in lighting devices, such as fluorescent lamps and high pressure mercury vapor lamps according to well-known coating techniques.

Due to the unique structure of lanthanum oxysulfide which is similar to that found in the oxysulfides of yttrium and gadolinium, complete solid solutions of these oxysulfides can be formed. For example, up to about 10 atom percent of lanthanum ions can be replaced by yttrium and gadolinium ions without serious deterioration of performance and cost of the lanthanum oxysulfide phosphors.

Still, methods other than those reducing methods described herein can be suitably employed to form the phosphors and effect the processes disclosed. Among the numerous oxychalcogenide phosphors which can be prepared are those oxysulfide phosphors employing other host lattices such as yttrium oxysulfide-europium, or terbium activated; lanthanum oxyselenide-europium or terbium activated; gadolinium oxysulfide-europium or terbium activated; lanthanum oxytelluride-europium or terbium activated and the like.

In the full utilization of the phosphors prepared by the novel process of this invention in a film screen system, it appears particularly desirable to employ light sensitive film which have a very high speed when exposed to these light energy emitted by these phosphors. Of particular advantage are the green-sensitive films which can easily record light emission from conventional zinc sulfide screens, for example, and those described in U.S. Pats. 3,397,987 issued Aug. 20, 1968 to Luckey et al.; 2,996,382 issued Aug. 15, 1961 to Luckey et al.; 3,178,282 issued Apr. 13, 1965 to Luckey and others.

It will be understood by those skilled in the art that extreme care is taken to avoid impurities in the various reactants such as those reactants including the rare earths. Trace amounts of ions which serve as harmful addenda are, although difficult to absolutely separate from the wanted materials, nonetheless generally unwanted due to the fact that certain of these ions appear to function as quenching materials for the emitting phosphor.

The following examples are intended for a further understanding and description of the invention.

EXAMPLE 1

A solution of 1.0 M lanthanum trichloride is prepared by dissolving 814.5 grams of lanthanum oxide (99.99 percent) in 1230 ml. of 37.5 percent hydrochloric acid and sufficient distilled water to make 5 liters of solution. A solution of 0.4 M terbium trichloride is prepared by dissolving 36.6 grams of terbium oxide (99.9 percent) in 60 ml. of 37.5 percent hydrochloric acid and sufficient distilled water to make 0.5 liter of solution. A solution of 1 M sodium sulfite is prepared by dissolving 630.2 grams of anhydrous Reagent Grade sodium sulfite in sufficient distilled water to make 5 liters of solution. Finally, a solution of 1 M sodium bisulfite is prepared by dissolving 190 grams of anhydrous sodium metabisulfite in sufficient distilled water to make 2 liters. All of these solutions are filtered through Millipore Filters with $0.45\mu$ pores.

A solution (A) is prepared by mixing 750 ml. of the 1.0 M lanthanum trichloride solution and 12.5 ml. of the 0.4 M terbium chloride solution with sufficient distilled water to make 5 liters. A solution (B) is prepared by mixing 1125 ml. of 1 M sodium sulfite with sufficient distilled water to make 5 liters. A solution (C) is prepared by mixing 112.5 ml. of 1 M sodium bisulfite with sufficient distilled water to make 4 liters.

Solution C is placed in a fluted 22-liter reaction vessel having a round bottom, approximately 37 inches in diameter having three openings at the top. Four equally spaced vertical flutings or indentations, 1 inch deep at their midpoint and about 20 inches long, are made in the side of the flask to act as baffles. A glass agitator with a hollow cylindrical blade is used as a convenient stirrer.

The Solution C is heated to a temperature of 95° C. Solutions A and B are heated to 70° C. Solution A and Solution B are then simultaneously added at a rate of 250 ml. of each per minute to Solution C, which is agitated at between 1000 to 2000 r.p.m. When the addition is complete, the precipitate is heated with stirring to between 95° C. and 100° C. in the supernatant liquid. Then the volume of the slurry is decreased to 2 liters by allowing the precipitate to settle and by decanting the excess supernatant liquid, and the precipitate is ripened at about 95° C. to 100° C. for one hour. The precipitate is then washed four times with hot water, collected on a suction funnel, and dried in air at room temperature. The grains of the precipitate are cubes, substantially uniform in size and about $10\mu$ on an edge.

13

The dry precipitate is then placed in a Vycor (a trademark of Corning Glass Works for fire resistant glassware) container and heated in a furnace to 800° C., and argon gas passed through the furnace at a rate of 2 cubic feet per hour as measured with a flow meter calibrated for air. At 800° C., hydrogen is also passed through the furnace at a rate of 1.2 cubic feet per hour as measured with a flow meter calibrated for air. The temperature is slowly increased to 940° C., then the furnace is turned off and the sample cooled slowly in argon. The powder is then placed in a covered Vycor crucible and heated to 1125° C. in air for one hour in a muffle furnace. After cooling, the powder is removed and placed in a metal container with a diameter of 2.5 cm. and a depth of 0.2 cm.

The filled container is then exposed to 70 kv. p. X-rays, filtered by ½ mm. of copper and 1 mm. of aluminum. The fluorescence of the powder in the container is measured with a film having a coarse-grained, panchromatically-sensitized gelatin silver bromoiodide emulsion coated on a cellulose triacetate support, developed for 5 minutes in Kodak Developer D–19 at a temperature 20° C. The relative speed of this and other phosphors is calculated from the developed densities of the film. The speeds are not corrected for the change in sensitivity of the film with wavelength. Since the film has less sensitivity in the green and red region of the spectrum than it does in the blue region, a correction for spectral sensitivity would increase the relative speed of the lanthanum oxysulfide phosphor by about 60 percent.

The speeds given in this and subsequent examples are a measure of the sensitivity of a radiographic screen-film-process system comprising the phosphor and the film and process that are used. The speed of the $La_2O_2S$:Tb phosphor is 215, relative to a speed of 78 for a sample of commercial calcium tungstate. The spectral distribution of the fluorescence from the phosphor is measured and it is found that more than 65 percent of the emitted radiation is at 544 nm., with smaller amounts at 588 and 491 nm. Thus, the phosphor prepared in the manner described in this example is of value as a detector for X-rays and for use in radiographic intensifying screens. Afterglow of this phosphor after exposure to X-rays is negligible contrasted to a commercially prepared $La_2O_2S$:Tb phosphor which exhibits appreciable afterglow.

Similar results are obtained by reducing the precipitate at 800° C., followed by cooling in an inert atmosphere then by igniting for 1 hour at 1125° C. in a closed crucible.

EXAMPLE 2

A solution (A) is prepared by mixing 750 ml. of the 1.0 M lanthanum trichloride solution described in Example No. 1 with 30 ml. of 0.3 M europium trichloride solution, and sufficient distilled water to make 5 liters. A solution (B) is prepared by mixing 1125 ml. of 1 M sodium sulfite with sufficient distilled water to make 5 liters. A solution (C) is prepared by mixing 45 ml. of 1 M sodium sulfite with sufficient water to make 4 liters.

Solution C is placed in the fluted 22-liter reaction vessel and is heated to 95° C. Solutions A and B are heated to 70° C., then are simultaneously added at a rate of 250 ml. of each per minute to Solution C, which is agitated in the manner described before. When the addition is complete, the precipitate is heated to 95° C. in the supernatant liquid. Then the volume of the slurry is decreased to 2 liters by allowing the precipitate to settle and by decanting the excess supernatant liquid. The precipitate is then ripened at 95° C. for 1 hour. After ripening, the precipitate is washed four times with hot water, collected on a suction funnel, and dried in air at room temperature. The grains of the precipitate are cubic, but the corners are not quite as well defined as those in the preceding example. The size of the grains is similar to that of the grains in Example No. 1.

14

The dry precipitate is then placed in a Vycor container and heated in a furnace to 777° C. for 1 hour in air. Then it is heated in the argon-hydrogen atmosphere described in Example No. 1 for 2¼ hours at 810° C. Finally the powder is placed in a covered Vycor crucible and heated to 1125° C. for 1 hour. After cooling, the powder is removed and the speed with irradiation by filtered 70 kv. p. X-rays measured as described in the preceding example and calculated at 217, compared with only 78 for a sample of a conventionally-prepared calcium tungstate phosphor.

EXAMPLE 3

The precipitation of Example No. 2 is repeated and the precipitate ripened, washed and dried as described in that example.

The precipitate is then placed in a Vycor crucible and heated in air to 930° C. The powder is fluorescent when irradiated with X-rays or with ultraviolet radiation at $\lambda=254$ nm. The main emission peak is at 617 nm. with less intense peaks in the region from 580 to 600 nm. X-ray diffraction shows that the powder consists mainly of lanthanum oxysulfate. The intensity of fluorescence is substantially less than that obtained when the same material is converted to lanthanum oxysulfide by the method described in Example No. 2.

EXAMPLE 4

Aqueous solutions of 1.0 M lanthanum trichloride, 0.4 M terbium trichloride, 1.0 M sodium sulfite, and 1.0 M sodium bisulfite are prepared as described in Example No. 1.

A solution (A) is prepared by mixing 1500 ml. of the 1.0 M lanthanum trichloride and 20 ml. of the 0.4 M terbium trichloride with sufficient distilled water to make 5 liters. A solution (B) is prepared by mixing 2250 ml. of the 1.0 M sodium sulfite with sufficient distilled water to make 5 liters. A solution (C) is prepared by mixing 112.5 ml. of 1.0 M sodium bisulfite with sufficient distilled water to make 4 liters.

Solution C is placed in the fluted 22-liter reaction vessel described in Example No. 1 and heated to a temperature of 95° C. Solutions A and B are heated to 70° C. Solution A and Solution B are then simultaneously added at a rate of 250 ml. of each per minute to Solution C, which is agitated in the manner described in Example No. 1. When the addition is complete, the precipitate is heated to 95° C. in the supernatant liquid, the volume of the slurry is decreased to 2 liters by allowing the precipitate to settle and by decanting the excess supernatant liquid, and the precipitate is ripened at 95° C. for one hour. The precipitate is then washed four times with hot water, collected on a suction funnel, and dried in air at room temperature. A sample of the precipitate before ripening and a sample of the dry precipitate are dispersed in a 2 percent solution of gelatin, dried on a microscope slide and photographed.

About 200 grams of the dry ripened precipitate are then placed in a quartz tray and heated to a temperature of 825° C. in a mixture of argon and hydrogen until water vapor no longer evolves. Approximately four hours are needed for the reaction, with flows of 1.5 cubic feet per hour for argon and 1.6 cubic feet per hour for hydrogen, measured with flow meters calibrated with air. The powder is then placed in a covered Vycor crucible and ignited to 1125° C. for 1 hour. After cooling, the powder is tested as described in Example No. 1. The speed of the phosphor is 186. The grains of the phosphor are shown in FIG. 3. The relationship among the grains in the various series of photographs shows the superiority of the present invention producing uniform, well-formed crystals of lanthanide oxysulfides.

EXAMPLE 5

Aqueous solutions of 1 M sodium sulfite and 1 M sodium bisulfite are prepared in the manner described in Example 1.

A solution (A) is prepared by mixing 1500 ml. of the 1 M lanthanum trichloride solution and 20 ml. of the 0.4 M terbium trichloride solution with sufficient distilled water to make 5 liters. A solution (B) is prepared by mixing 2250 ml. of 1.0 M sodium sulfite solution with sufficient distilled water to make 5 liters. A solution (C) is prepared by mixing 112.5 ml. of the 1 M sodium bisulfite solution with sufficient distilled water to make 4 liters.

Solution C is placed in a fluted 22-liter reaction vessel and heated to a temperature of 95° C. Solutions A and B are heated to 70° C. Solutions A and B are simultaneously added at a rate of 250 ml. of each per minute to Solution C. When the addition is complete, the temperature is increased to 100° C., the precipitate allowed to settle and the supernatant liquid decanted so that the total volume of precipitate and supernatant liquid is decreased to 2 liters. The precipitate is then ripened for 1 hour at 95° C. in the supernatant liquid. After washing four times with distilled water, the precipitate is collected and dried in air at room temperature.

The dry precipitate is then placed in a Vycor boat and heated to 800° C. Argon gas and hydrogen are admitted to the tube furnace at flow rates of 2 c.f.h. and 1.2 c.f.h. as measured with a flow meter calibrated for air. When evolution of water vapor essentially stops, as detected by condensation on a plate of glass placed about 1 inch from the end of the furnace tube, the hydrogen is turned off and the powder slowly cooled in an argon atmosphere. The powder is then placed in a covered porcelain crucible and heated for ¾ hour at 1125° C. The speed of the phosphor is measured as described in Example No. 1, but in making the comparison, the film is developed for 12 minutes in Kodak Developer D–19 at a temperature of 75° F. instead of the time and temperature used in Example No. 1. In the present comparison, the speed of the calcium tungstate phosphor is 92 instead of the value of 78 obtained in the earlier test; the speed of the terbium-activated lanthanum oxysulfide prepared as described in this example is 235.

The sensitivity in the green region of the spectrum of the film used in these tests is about half that in the blue region. Therefore, the quantum efficiency of the green-emitting phosphor relative to that of the blue-emitting calcium tungstate is substantially greater than that indicated by this test.

This $La_2O_2S$:Tb phosphor is milled and coated on clear polyester support as described in Examples 1 and 2 in coverages ranging from 42 to 94 grams per square foot and the pigment/binder ratio is 15.1/1 by weight.

A spectrally sensitized, coarse-grain silver bromoiodide emulsion is coated on top of a fogged internal image emulsion similar to that described in Example No. 2 of U.S. 3,397,987 issued to Luckey et al. on Aug. 20, 1968. The coverage of the silver bromoiodide emulsion is 450 mg. Ag per square foot; the coverage of the internal image emulsion is 165 mg. Ag per square foot. The internal image emulsion is coated on top of a poly(ethylene terephthalate) film support with an anti-halation layer on the back. The film is placed in contact with one of the screens described in the preceding paragraph. This screen contains 42 grams of phosphor per square foot. The screen-film combination is exposed to 70 kv. p. X-rays filtered by ½ mm. of copper and 1 mm. of aluminum for $\frac{1}{15}$ second at a distance of 65 inches from the X-ray tube, then developed for 2.5 minutes at 95° F. in the developer described in Example No. 1 of U.S. 3,397,987. A steel wire test object is placed between the tube and the film. The speed of this system is compared with that of a system consisting of two conventional $CaWO_4$ screens and a nonspectrally sensitized, coarse-grain gelatin silver bromoiodide (2 mole percent iodide) emulsion coated on each side of a cellulose acetate support. The silver coverage of this film is about 1000 mg. Ag per square foot. The screen-film combination is exposed for $\frac{3}{20}$ second at a distance of 60 inches from the X-ray tube. The same filters and test object are used. The film is then developed in Kodak D–19 for 5 minutes in a tank at 20° C. Comparison of the two radiographs show that the image on the film exposed with the lanthanum oxysulfide screen is sharper than that on the film exposed with the calcium tungstate screens. The lanthanum oxysulfide screen-film system is 2½ times faster than the calcium tungstate screens-film system when exposed in the manner described.

EXAMPLE 6

In order to maintain high degrees of reproducibility of the sulfite and bisulfite solutions in spite of light and oxygen attack and to avoid variations in water vapor in the reducing atmosphere, the following process employs fresh sulfite and an excess of lanthanide ion along with a pH control of the lanthanide ion solution.

A solution (A) is prepared by mixing 1000 ml. of the 1.0 M lanthanum trichloride solution and 6.2 ml. of the 0.4 M terbium trichloride solution with distilled water sufficient to make 3 liters. The pH of the solution is adjusted to 1.8 with ammonium hydroxide, then 16 ml. of 37.5% Reagent Grade hydrochloric acid is added along with sufficient distilled water to make a total volume of 5 liters.

A solution (B) is prepared by mixing 189 grams of Reagent Grade sodium sulfite with 2.5 grams of pure hydroquinone and sufficient distilled water to make 5 liters.

A third solution (C) is prepared by mixing 200 ml. of the 1.0 M lanthanum trichloride solution with distilled water to make a volume of 2 liters. The pH of this solution is adjusted to 1.8 with hydrochloric acid and then diluted to 6 liters with distilled water.

Solution (C) is placed in a fluted 22-liter reaction vessel and heated to a temperature of 95° C. Solutions (A) and (B) are heated to 80° C. and are simultaneously added at a rate of 125 ml. of each per minute to solution (C) which is agitated in the manner described before. When the addition is complete, the temperature is increased to 100° C. and the precipitate is agitated in the supernatant solution at that temperature for 1 hour. At the end of this time, the precipitate is allowed to settle, the supernatant liquid removed and the precipitate washed four times with cold distilled water. The precipitate is then collected and dried in air at room temperature.

The dry precipitate is placed in a vitreous carbon boat made by the Beckwith Carbon Corporation, Van Nuys, Calif., and heated to 500° C. in a tube furnace with argon gas flowing through at a rate of 1.2 c.f.h. Then hydrogen gas is admitted to the tube at a rate of 2 c.f.h. and the temperature increased to 800° C. in about 1 hour. The gas stream is passed through two 500 ml. gas washing bottles, ⅔ full of water and connected in series, before entering the reaction vessel. The sample is heated at this temperature with both gases flowing through the tube at the stated rates until evolution of water vapor ceases as detected by a mirror placed 1 inch from the end of the exit tube. Then the powder is cooled to room temperature in about ½ hour.

The powder is placed in an aluminum oxide crucible and covered with a procelain cover. This crucible is placed inside a larger crucible made from Vitreosil quartz and covered with a Vitreosil quartz lid. The outer crucible also contains fragments of glassy carbon. The assembly is then placed in a muffle furnace and heated to 1120° C. for 45 minutes. After cooling, the powder is tested and the speed is 415, compared with a speed of 92 for the commercial calcium tungstate phosphor.

The emission of this phosphor is also excited with ultraviolet radiation at 284 nm. The absolute quantum efficiency of the emission from this phosphor when excited by radiation at 254 nm. is nearly 100 percent.

EXAMPLE 7

In order to show that the obvious expedient of using mixed sulfate precipitates is unsuitable for making lanthanum oxysulfide phosphors according to the present invention, three solutions are prepared as before.

A solution (A) is prepared by mixing 500 ml. of a 2 M solution of lanthanum trichloride with 12.5 ml. of 0.4 M terbium trichloride. The pH of the solution is adjusted to 1.8 with hydrochloric acid and ammonium hydroxide, then it is diluted with sufficient distilled water to make 1 liter.

A solution (B) is prepared by mixing 500 ml. of 3 M sodium sulfate with sufficient water to make 1 liter.

A solution (C) is prepared by mixing 50 ml. of 3 M sodium sulfate with sufficient distilled water to make 2 liters of solution.

Solution (C) is placed in a fluted 5-liter flask that has been described in U.S. Ser. No. 657,062, filed July 31, 1967, and heated to 95° C. Solutions (A) and (B) are heated to 70° C., then added simultaneously to solution (C) at a rate of 80 ml. of each per minute. When the precipitation is complete, the supernatant liquid is removed and the precipitate washed four times with cold distilled water. Then the precipitate is collected and dried in air at room temperature.

The dry precipitate is reduced and ignited in the manner described before. The speed of the ignited material is negligible.

EXAMPLE 8

Lanthanum and gadolinium oxysulfide phosphors having a high efficiency when excited with X-ray are conveniently prepared by the present method. When coated on a suitable support thereafter, forming fluorescent screens, they compare favorably with those phosphorescent screens of the prior art.

A solution (A) is prepared by mixing 500 ml. of 2 M gadolinium trichloride and 6.2 ml. of 0.4 M terbium trichloride in sufficient distilled water to make 2 liters. The pH of the solution is adjusted to 1.8 with hydrochloric acid and ammonia, then 16 ml. of 37.5 percent hydrochloric acid is added along with sufficient distilled water to make 5 liters.

A solution (B) is prepared by mixing 202 grams of ammonium sulfite monohydrate and 2.5 grams of hydroquinone with sufficient distilled water to make 5 liters.

A solution (C) is prepared by mixing 100 ml. of the 2 M gadolinium trichloride solution with sufficient distilled water to make 2 liters of solution, the pH is adjusted to 1.8 with hydrochloric acid, then the solution diluted to 6 liters with distilled water.

Solution (C) is placed in the 22-liter fluted flask described hereinbefore and heated to 90° C. Solutions (A) and (B) are heated to 80° C. Then solutions (A) and (B) are simultaneously added to solution (C) at a rate of 250 ml. of each per minute. When the addition is complete, the precipitate is heated for 1 hour in the supernatant liquid at a temperature of 100° C. Then the precipitate is allowed to settle and the supernatant liquid removed by decantation. The precipitate is washed four times with distilled water, and dried in air at room temperature. The precipitate is reduced and ignited as described hereinabove. The speed of the ignited precipitate is 325. The crystal structure of the phosphor corresponded to that of gadolinium oxysulfide, terbium activated.

EXAMPLE 9

The lanthanide sulfites used in the process of this invention can be prepared in a variety of ways with substantially no adverse effect on the properties of the phosphor prepared by the reduction and ignition manner described herein. For example, precipitation of the lanthanum sulfite can be effected from a homogeneous solution comprising lanthanum oxide, sulfur dioxide and terbium trichloride filtered, buffered and diluted in order to insure precipitation at elevated temperatures of from between about 40° and 100° C. By varying the volume and the concentration of the activator, phosphors with faster speeds are obtained.

A solution is prepared by mixing 80 grams of lanthanum oxide and sufficient sulfur dioxide and distilled water to make 4 liters. Then the solution is filtered through a Type HAWP millipore filter, mixed with 3.06 ml. of 0.4 M terbium trichloride solution, and diluted to 5 liters with distilled water. The pH of the dilute solution is 2.2. The solution is then divided into two 2.5-liter portions, placed in two 4-liter beakers and heated with stirring. Precipitation begins at about 40° C. and steadily increases as the temperature increases. About one hour is needed to reach 100° C., then the precipitates are ripened in the supernatant solutions for one hour with stirring, washed four times with distilled water and dried in air. The dry precipitates are combined and reduced and ignited in the manner described before. The speed of the ignited phosphor is 360.

The invention has been described in detail with particular reference to certain preferred embodiments thereof, but it will be understood that variations and modifications can be effected within the spirit and scope of the invention.

It is claimed:

1. A process for the preparation of a rare-earth-metal-activated oxysulfide phosphor having a host matrix derived from yttrium or from a lanthanide element with an atomic number of 57 to 71, which comprises the steps of (1) forming a sulfite precursor of said phosphor, (2) heating said sulfite precursor in a substantially fluxless, non-halide, non-chalcogenating, reducing gas atmosphere, (3) igniting the product obtained in step (2) in an inert atmosphere at a higher temperature than that employed in step (2), and (4) recovering the oxysulfide phosphor produced thereby.

2. The process of claim 1 wherein said precursor is formed by:
   (a) metering into a reaction solution separate solutions of sulfite anions and of yttrium or lanthanide cations containing a rare-earth-metal activator at a rate for each sufficient to maintain in the reaction solution throughout the reaction a concentration of up to about one molar of an excess selected from an excess of said anions over said cations or an excess of said cations over said anions,
   (b) preventing local excesses of said anions and cations in said reaction solution, and
   (c) growing crystals of said precursor in said reaction solution to a size of at least 0.5 micron.

3. The process of claim 1 wherein the heating in step (2) is carried out at a temperature of from about 700° C. to about 950° C.

4. The process of claim 1 wherein the heating in step (2) is carried out at a temperature of from about 800° C. to about 900° C.

5. The process of claim 1 wherein the time of heating in step (2) is from about 2 to about 4 hours.

6. The process of claim 1 wherein the temperature employed in step (3) is from about 1000° C. to about 1400° C.

7. The process of claim 1 wherein the temperature employed in step (3) is from about 1000° C. to about 1200° C.

8. The process of claim 1 wherein the time employed in step (3) is from about ½ hour to about 2 hours.

9. The process of claim 1 wherein the reducing atmosphere employed in step (2) comprises hydrogen.

10. The process of claim 1 wherein the reducing atmosphere employed in step (2) is a mixture of hydrogen, argon, carbon monoxide and water vapor.

11. The process of claim 1 wherein the host matrix is derived from lanthanum, yttrium, gadolinium or lutetium.

12. The process of claim 1 wherein the rare earth activator is europium, terbium, thulium, samarium, dysprosium or praeseodymium.

13. The process of claim 1 wherein the host matrix is derived from lanthanum and the rare earth activator is europium or terbium.

14. The process of claim 1 wherein the rare earth activator is present in a concentration range of from about 0.01 mole percent to about 10 mole percent.

References Cited

UNITED STATES PATENTS 3,418,246  12/1968  Royce _____ 252—301.4 S
3,562,174  2/1971   Schuil _____ 252—301.4 S ROBERT D. EDMONDS, Primary Examiner U.S. Cl. X.R.

23—21, 134